(12) United States Patent
Jambrosic et al.

(10) Patent No.: US 12,352,192 B2
(45) Date of Patent: Jul. 8, 2025

(54) WELDING COMPONENT, AND METHOD FOR WELDING THE WELDING COMPONENT TO A COMPONENT

(71) Applicant: Purem GmbH, Neunkirchen (DE)

(72) Inventors: Kresimir Jambrosic, Reichenbach (DE); Christoph Gotthard, Esslingen (DE); Hagen Korb, Aichwald (DE)

(73) Assignee: Purem GmbH, Neunkirchen (DE)

( * ) Notice: Subject to any disclaimer, the term of this patent is extended or adjusted under 35 U.S.C. 154(b) by 24 days.

(21) Appl. No.: 17/930,322

(22) Filed: Sep. 7, 2022

(65) Prior Publication Data

US 2023/0074062 A1    Mar. 9, 2023

(30) Foreign Application Priority Data

Sep. 8, 2021   (DE) .................. 10 2021 123 190.6

(51) Int. Cl.
| | |
|---|---|
| *B23K 31/12* | (2006.01) |
| *F01N 13/00* | (2010.01) |
| *F16L 41/08* | (2006.01) |
| B23K 101/00 | (2006.01) |

(52) U.S. Cl.
CPC .......... *F01N 13/008* (2013.01); *B23K 31/125* (2013.01); *F16L 41/082* (2013.01); B23K 2101/006 (2018.08); F01N 2450/22 (2013.01)

(58) Field of Classification Search
CPC ............................... F16L 41/082; F16L 13/02
USPC .......................................... 285/288.1–288.5
See application file for complete search history.

(56) References Cited

U.S. PATENT DOCUMENTS

| | | | | | |
|---|---|---|---|---|---|
| 1,933,772 | A | * | 11/1933 | Stresau ................. | F16L 41/082 220/601 |
| 2,015,246 | A | * | 9/1935 | Hall ...................... | F16L 41/082 219/137 R |
| 2,136,474 | A | * | 11/1938 | Straty ................... | F16L 41/082 285/55 |
| 3,429,591 | A | * | 2/1969 | Loyd ..................... | F16L 41/082 285/288.4 |
| 3,506,285 | A | * | 4/1970 | Coates .................... | F16L 13/02 228/178 |

(Continued)

FOREIGN PATENT DOCUMENTS

| CN | 201206719 Y | 3/2009 |
|---|---|---|
| CN | 106735999 A | 5/2017 |

(Continued)

OTHER PUBLICATIONS

English translation of the first Office action of the Chinese Patent Office dated Apr. 30, 2025 in corresponding Chinese patent application 202211087315.5.

*Primary Examiner* — Matthew Troutman
*Assistant Examiner* — Fannie Kee
(74) *Attorney, Agent, or Firm* — Walter Ottesen, P.A.

(57) ABSTRACT

A welding component is provided for welding to a component via at least one welding region. The welding component includes: at least one welding indicator arrangement provided on the welding component; and, the at least one welding indicator arrangement includes a welding region minimum indicator to be covered by the at least one welding region and a welding region maximum indicator not to be covered by the at least one welding region.

12 Claims, 4 Drawing Sheets

(56) References Cited

U.S. PATENT DOCUMENTS

| | | | | |
|---|---|---|---|---|
| 4,066,861 A | * | 1/1978 | Broodman | F16L 41/082 |
| | | | | 165/173 |
| 4,535,214 A | | 8/1985 | Meyer et al. | |
| 6,698,801 B1 | * | 3/2004 | Boecking | F16L 41/082 |
| | | | | 285/141.1 |
| 7,011,343 B1 | * | 3/2006 | Shah | F16L 13/02 |
| | | | | 285/288.1 |
| 7,509,739 B2 | * | 3/2009 | Okita | B23K 33/008 |
| | | | | 29/894.323 |
| 2003/0150413 A1 | | 8/2003 | Merz | |
| 2007/0171959 A1 | | 7/2007 | Irrgang et al. | |
| 2009/0152865 A1 | * | 6/2009 | Zuber | F16L 13/02 |
| | | | | 285/288.11 |
| 2011/0012342 A1 | * | 1/2011 | Harhoff | F16L 41/082 |
| | | | | 123/456 |
| 2019/0381594 A1 | * | 12/2019 | Kim | F16L 13/02 |
| 2020/0271546 A1 | * | 8/2020 | Mohr | F16L 41/082 |

FOREIGN PATENT DOCUMENTS

| | | |
|---|---|---|
| DE | 100 34 265 A1 | 2/2001 |
| DE | 103 46 205 A1 | 9/2004 |
| DE | 10 2009 002 812 A1 | 11/2010 |
| DE | 10 2010 063 113 A1 | 6/2012 |
| WO | 2012/077405 A1 | 6/2012 |

* cited by examiner

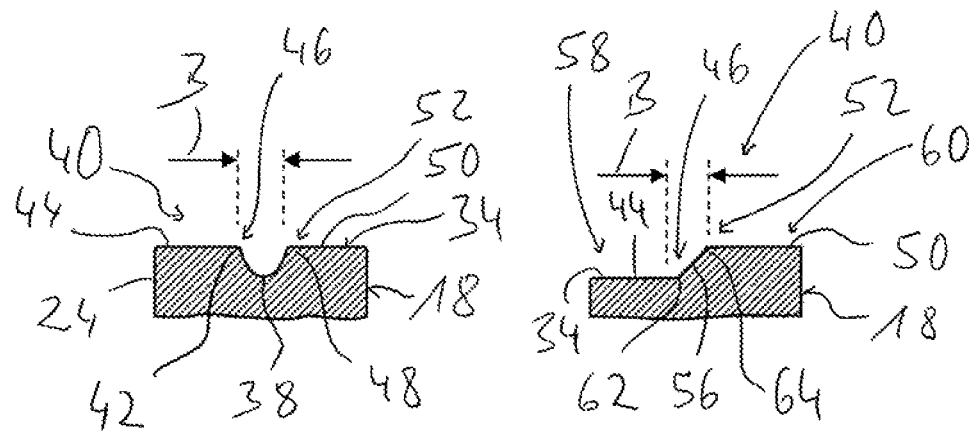
Fig. 5A                    Fig. 5B
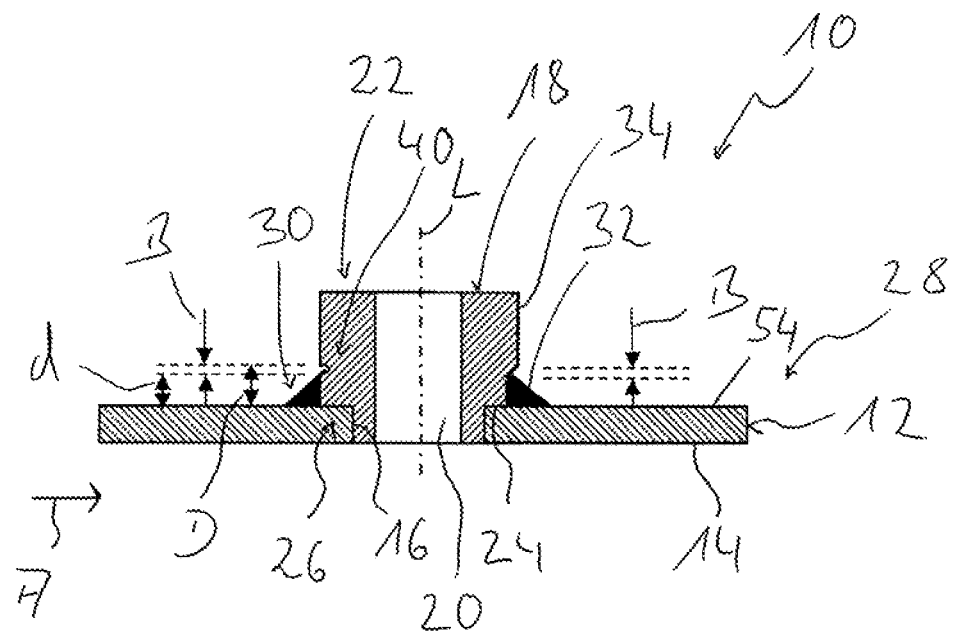
Fig. 6

WELDING COMPONENT, AND METHOD FOR WELDING THE WELDING COMPONENT TO A COMPONENT

CROSS REFERENCE TO RELATED APPLICATION

This application claims priority of German patent application no. 10 2021 123 190.6, filed Sep. 8, 2021, the entire content of which is incorporated herein by reference.

TECHNICAL FIELD

The present disclosure relates to a welding component which, via at least one welding region, is fixed on a component.

BACKGROUND

In the production of exhaust systems for internal combustion engines, for example, it is known for connecting pieces for receiving sensors to be established on exhaust gas conducting components, for example pipes or housings by welding, wherein the connecting pieces are considered to be welding components and the exhaust gas conducting components are considered to be components. To this end, a welding component of this type is positioned so as to bear on a pipe or a housing, and fixed by a weld seam that establishes the bond between the connecting piece and the pipe, or the housing, respectively, and in general completely encircles the connecting pieces.

SUMMARY

It is an object of the present disclosure to provide a welding component as well as a method for welding a welding component of this type to a component, by way of which, using simple method steps the possibility of checking a correct configuration of a welding region that establishes a fixed bond between welding component and component is achieved.

According to a first aspect of the present disclosure, this object is achieved by a welding component for welding to a component via at least one welding region, at least one welding indicator assembly being provided on the welding component, the at least one welding indicator assembly including a welding region minimum indicator to be covered by the at least one welding region, and a welding region maximum indicator not to be covered by the at least one welding region.

The provision of a welding indicator assembly of this type upon generating a welding region offers the possibility of establishing by visual checking, optionally also by an optical testing system, whether the welding region sufficiently captures the welding component. If a welding region of this type covers the welding region minimum indicator while not covering the welding region maximum indicator, this means that the welding region is of a correct size. If the welding region does not cover the welding region minimum indicator, or if the welding region also cover the welding region maximum indicator, this indicates that the welding region is of an excessively small or large size, respectively, and optionally has to be reworked.

For a positive visual perceptibility, the welding region minimum indicator can also include a contour modification of the welding component. The welding region maximum indicator can also include a contour modification of the welding component.

A contour modification of this type can be provided in that, for example, the at least one welding indicator assembly in terms of an external contour of the welding component includes at least one depression region.

For example, the welding region minimum indicator can include a transition from the external contour to the depression region, and the welding region maximum indicator can include a transition from the depression region to the external contour.

In an alternative embodiment, at least one welding indictor assembly in terms of the external contour of the welding component can include two depression regions mutually disposed at a spacing.

In particular in the case of a welding component that is elongate, or extends, in the direction of a welding component longitudinal axis, the external contour in terms of a welding component longitudinal axis can be an external circumferential contour of the welding component, and the at least one depression region in terms of the welding component longitudinal axis can include a preferably fully encircling groove-type depression.

In an alternative type of embodiment of a welding component, a positive visual perceptibility of the quality, or of the dimensions, respectively, of a welding region can be achieved in that the welding indicator assembly, between a first external contour region and a second external contour region, offset in terms of the first external contour region, includes a transition region, and that the welding region minimum indicator includes a transition from the first external contour region to the transition region, and the welding region maximum indicator includes a transition from the transition region to the second external contour region.

To this end, the first external contour region in terms of a welding component longitudinal axis can be a first external circumferential contour region of the welding component, and the second external contour region in terms of the welding component longitudinal axis can be a second external circumferential contour region of the welding component. In the case of an embodiment of this type, the welding component in the first external contour region in terms of the welding component longitudinal axis has a different radial dimension than in the second external contour region so that a transition from the radial dimension in the first external contour region to the radial dimension in the second external contour region is provided in the transition region.

For example, the transition region can be configured so as to be substantially frustoconical.

For defined positioning of a welding component in terms of a component to be connected thereto by welding, it is proposed that a support region for supporting on a component to be welded to the welding component is provided on the welding component, and that the welding region minimum indicator has a smaller spacing from the support region than the welding region maximum indicator.

In particular in the use in an exhaust system of an internal combustion engine, the welding component can be a connecting piece, preferably a sensor receptacle connecting piece, having a receptacle opening, wherein a component support face for supporting the connecting piece on a component to be welded to the connecting piece is provided on the connecting piece. In this instance, the at least one welding indicator assembly can be provided on an external circumferential region of the connecting piece.

According to a further aspect, the object set forth at the outset is achieved by a method for welding at least one welding component according to the disclosure to a component, the method including the following measures:

a) disposing the at least one welding component in a relative welding position in terms of the component;

b) generating at least one welding region for fixing the welding component to the component in such a manner that the welding region minimum indicator of at least one welding indicator assembly is covered by at least one welding region, and the welding region maximum indicator of this welding indicator assembly is not covered by this welding region.

In this method, defined positioning of the components to be welded to one another, that is, of the welding component and the component, can be achieved in that in the measure a) the welding component for attaining the relative welding position is positioned so as to bear on the component by way of the support region.

When using a connecting piece as a welding component, in the measure a) the connecting piece can be positioned so as to bear on the component by way of the component support face, and the at least one welding region generated in the measure b) can include a preferably fully encircling weld seam about the connecting piece.

The disclosure furthermore relates to an exhaust system for an internal combustion engine, including at least one connecting piece which provides a welding component according to the disclosure and is established on an exhaust gas conducting component via a method according to the disclosure, the exhaust gas conducting component providing a component.

BRIEF DESCRIPTION OF THE DRAWINGS

The invention will now be described with reference to the drawings wherein:

FIGS. 5A and 5B show enlargements of different embodiments of welding indicator assemblies;

FIG. 6 shows a portion of an exhaust system having a connecting piece which provides a welding component; and, FIG. 7 shows a welding indicator having two spaced depression regions.

DESCRIPTION OF THE PREFERRED EMBODIMENTS

Figure 1:
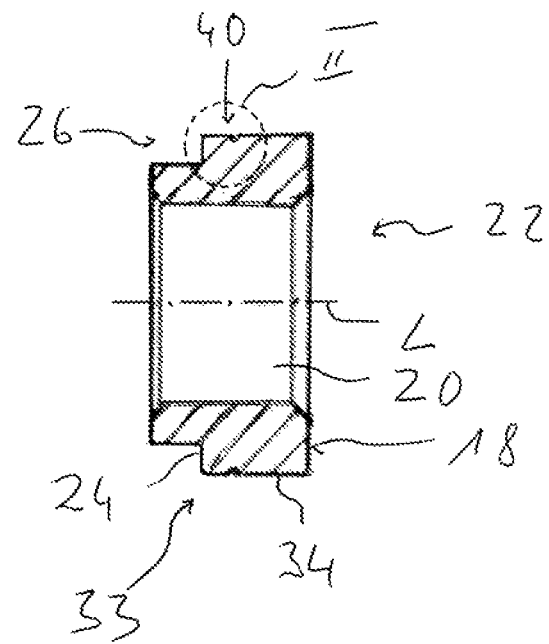
FIG. 1 shows a longitudinal sectional view of a connecting piece which provides a welding component.

Before going into details of the present disclosure, the context in which the disclosure can be applied will be explained with reference to FIG. 6.

FIG. 6 shows a portion of an exhaust system, denoted in general by the reference numeral 10, of an internal combustion engine, for example in the vehicle. The exhaust system 10 includes an exhaust gas conducting component 12 which is configured as a pipe or a housing, for example, and in the interior of which an exhaust gas A flows to or from an exhaust gas treatment unit such as, for example, a catalytic converter, a particle filter, or the like, for example.

An opening 16 is configured in a wall 14 of the exhaust gas conducting component 12, a connecting piece 18, for example configured for receiving a sensor, being established in the region of the opening 16 on the wall 14. A receptacle opening 20 is configured in the connecting piece 18, a sensor to be established on the connecting piece 18 being able to interact with the exhaust gas A by way of the receptacle opening 20.

The connecting piece 18 which in the context of the present disclosure provides a welding component 22 constructed using a metallic material is elongate in the direction of a welding component longitudinal axis L, or is configured so as to be substantially rotationally symmetric in relation to the latter, respectively, and by way of a component support face 24 provides a support region 26 by way of which the connecting piece 18 can be positioned in a relative welding position on the exhaust gas conducting component 12, the latter in the context of the present disclosure to be considered to be a component 28 constructed using a metallic material.

Establishing the connecting piece 18 on the exhaust gas conducting component 12 takes place by way of a weld seam 32 which preferably completely encircles the welding component longitudinal axis L and provides a welding region 30. In this way, a stable and simultaneously also gas-tight bond between the connecting piece 18, or the welding component 22, respectively, and the exhaust gas conducting component 12, or the component 28, respectively, is achieved.

Figure 2:
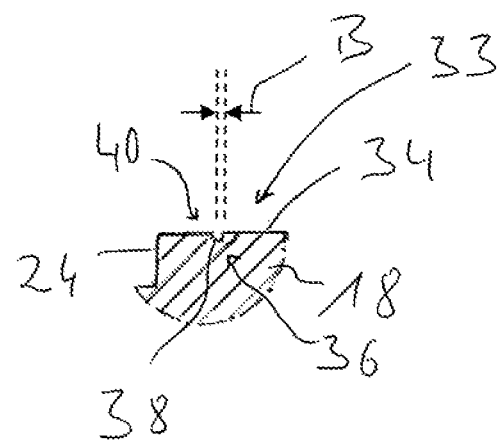
FIG. 2 shows the enlarged detail II in FIG. 1.

A first embodiment of a connecting piece 18 of this type is visualized in FIGS. 1, 2, 5A and in the left half of FIG. 6. Provided in this embodiment at an axial spacing from the component support face 24, on a substantially cylindrical external circumferential face 34 of the connecting piece 18 that provides or defines, respectively, an external contour 33, is a depression region 36 having a groove-type depression 38 that preferably fully encircles the welding component longitudinal axis L in the circumferential direction. The depression region 36, or the groove-type depression 38, respectively, in the direction of the welding component longitudinal axis L has a width B and generally provides a welding indicator assembly 40. A transition 42 from the groove-type depression 38 to a part 44 of the external circumferential face 34 that lies between the groove-type depression 38 and the component support face 24 forms a welding region minimum indicator 46 of the welding indicator assembly 40, and a transition 48 from the groove-type depression 38 to a part 50 of the external circumferential face 34 that is farther away from the component support face 24 forms a welding region maximum indicator 52.

The axial spacing between the welding region minimum indicator 46 and the welding region maximum indicator 52 corresponds to the width B of the groove-type depression 38. In the case of the component 28, or the exhaust gas conducting component 12, respectively, in the relative welding position, which is provided for welding and is illustrated in FIG. 6, the welding region minimum indicator 46 from the external surface 54 of the component 28, or of the exhaust gas conducting component 12, respectively, that serves for supporting the welding component 22, or the connecting piece 18, respectively, has a spacing d which is smaller by the width B than a spacing D between the welding region maximum indicator 52 and the external surface 54.

After positioning the connecting piece 18 on the exhaust gas conducting component 12 in the relative welding position according to FIG. 6, the weld seam 32 in the transition region from the external circumferential face 34 of the connecting piece 18 to the external surface 54 of the exhaust gas conducting component 12 is generated in such a manner that the weld seam 32 on the external circumferential face 34 in the direction of the welding component longitudinal axis L extends into the region of the welding indicator assembly 40. This means that the weld seam 32 is generated such that the latter covers the part 44 of the external circumferential face 34 into the region of the welding region minimum indicator 46, or beyond the welding region minimum indicator 46, respectively, so that the welding region minimum indicator 46, thus the transition 42 between the groove-type depression 38 and the part 44 of the external circumferential face 34 can no longer be seen. However, the weld seam 32 does not extend so far that the weld seam 32 covers the entire groove-type depression 38 up to the welding region maximum indicator 52, thus the transition 48 to the part 50 of the external circumferential face 34 of the connecting piece 18.

The weld seam 32 is correctly sized or positioned, respectively, when the weld seam 32 extends along the welding component longitudinal axis L in such a manner. This can be verified by way of visual checking, for example via corresponding optical systems. If it is established that the welding region minimum indicator 46 is covered by the weld seam 32 while the welding region maximum indicator 52 can still be seen, the bond thus produced is considered to be correct. If it is established that, for example, the weld seam 32 does not cover the welding region minimum indicator 46, the latter thus still being visible during optical testing, it is considered that the weld seam 32 is not of the correct size. If it is established that not only the welding region minimum indicator 46 but also the welding region maximum indicator 52 is covered, the latter thus not being able to be identified during optical testing, the weld seam 32, or the welding region 30, respectively, is likewise considered as not being correctly performed. In cases in which the welding region 32 is considered as not being correctly performed, it can be examined in a subsequent operating step whether, or to what extent, a correction can or must be carried out so as to optionally perform rework on the welding region 30, or if the latter is not possible to reject the bond thus produced and exclude the latter from further processing.

Figure 3:
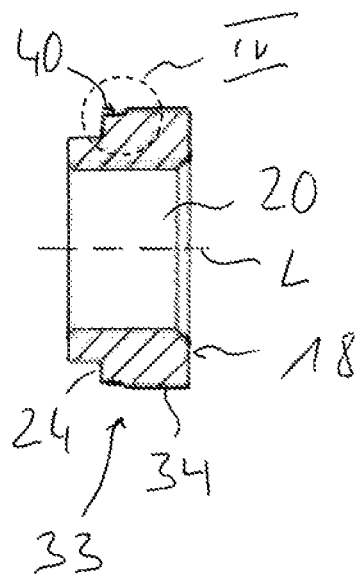
FIG. 3 shows a longitudinal sectional view, corresponding to that of FIG. 1, of an alternative type of embodiment of a connecting piece which provides a welding component.
Figure 4:
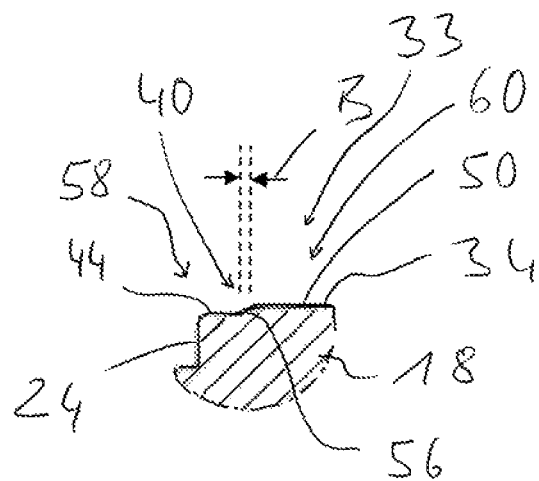
FIG. 4 shows the enlarged detail IV in FIG. 3.

An alternative embodiment is visualized in FIGS. 3, 4, 5B and in the right half of FIG. 6. In this type of embodiment, the welding indicator assembly 40 includes a transition region 56 between the parts 44 and 50 of the external circumferential face 34 of the connecting piece 18. This transition region 56 can also have the width B in the direction of the welding component longitudinal axis L. The transition 56 has a frustoconical structure, for example, so that the part 44 of the external circumferential face 34, which in this embodiment provides a first external contour region 58, from the welding component longitudinal axis L has a smaller radial spacing than the part 50 of the external circumferential face 34 that provides a second external contour region 60. A transition 62 from the part 44, or the first external contour region 58, respectively, to the transition region 56 in this embodiment provides the welding region minimum indicator 46. A transition 64 from the transition region 56 to the part 50 of the external circumferential face 34 that provides the second external contour region 60 provides the welding region maximum indicator 52.

When positioning the connecting piece 18 on the exhaust gas conducting component 12 in the relative welding position that can be seen in FIG. 6, the weld seam 32 is formed such that the latter along the welding component longitudinal axis L extends into the axial extent region of the transition region 56, such that the transition 62 is covered but not the transition 64. The weld seam 32 is considered as being correctly performed only in this instance. Otherwise, the weld seam 32 is considered as not being correctly performed, and it is decided whether or to what extent corrections are to be performed, or in what manner the corrections are to be performed, respectively.

As a result of the present disclosure it is possible with simple constructive measures to perform checking of a welding region in terms of whether the latter is of a correct size, or is embodied at the correct location, respectively. It is to be pointed out that welding indicator assemblies of this type can be provided on both components to be connected to one another by welding, thus on the welding component as well as on the component to be welded thereto. In the example illustrated, notches or groove-type depressions, respectively, could be formed as concentric rings, for example, on the wall 14 of the exhaust gas conducting component 12, so as to be on the external surface 54 thereof at a spacing from the opening 16, so as to by way of respective transitions to the external surface 54 provide a welding region minimum indicator and a welding region maximum indicator. Likewise, when the weld seam 32, which can be seen in FIG. 6, is to be carried out only in regions in the circumferential direction, a welding region minimum indicator and a welding region maximum indicator could be provided also on different circumferential positions of the connecting piece 18, on the external circumferential face 34 thereof, for example by way of a groove-type depression extending in the direction of the welding component longitudinal axis L in the external circumferential face 34.

Figure 7:
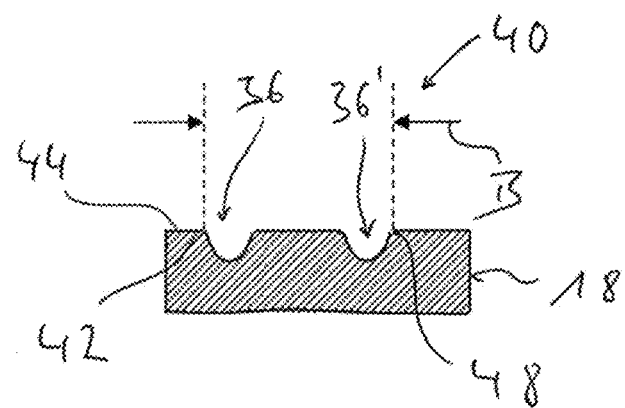

In an alternative embodiment of a welding indicator assembly, the latter could have two depression regions, or groove-type depressions, respectively, which are spaced apart, wherein one of these depression regions forms the welding region minimum indicator and, in the case of correct welding, should be at least partially covered by a welding region, while the other depression region provides the welding region maximum indicator and, in the case of correct welding, should not, or at least not completely, be covered by a welding region. FIG. 7 shows a welding indicator 40 having the two spaced depression regions 36, 36'.

It is understood that the foregoing description is that of the preferred embodiments of the invention and that various changes and modifications may be made thereto without departing from the spirit and scope of the invention as defined in the appended claims.

What is claimed is:

1. A welding component for welding to a component via at least one welding region, the welding component comprising:
   at least one welding indicator arrangement being provided on said welding component;
   said at least one welding indicator arrangement including a welding region minimum indicator to be covered by said at least one welding region and a welding region maximum indicator not to be covered by said at least one welding region;
   wherein said welding region minimum indicator includes a contour modification of said welding component and said welding region maximum indicator includes a contour modification of the welding component;
   wherein said welding component defines an external contour, said at least one welding indicator arrangement including at least one depression region with respect to said external contour of said welding component;

wherein said at least one depression region is a first depression region;
said at least one welding indicator arrangement includes a second depression region with respect to said external contour; and,
said first and second depression regions are disposed in spaced relationship to each other.

2. The welding component of claim 1, wherein said welding component has a support region for supporting said welding component on a further component to which said welding component is to be welded; and, said welding region minimum indicator has smaller spacing (d) from said support region than said welding region maximum indicator.

3. The welding component of claim 1, wherein:
said welding component is a connecting piece having a receptacle opening; said welding component has a component support surface for supporting said connecting piece on a further component to be welded to said connecting piece; and,
said at least one welding indicator arrangement is provided on an external circumferential region of said connecting piece.

4. The welding component of claim 3, wherein said connecting piece is a sensor receptacle connecting piece for an exhaust system of an internal combustion engine.

5. An exhaust system for an internal combustion engine, comprising:
at least one connecting piece, wherein said at least one connecting piece is a welding component for welding to an exhaust gas conducting component via at least one welding region;
said welding component including at least one welding indicator arrangement provided on said welding component;
said at least one welding indicator arrangement including a welding region minimum indicator to be covered by said at least one welding region and a welding region maximum indicator not to be covered by said at least one welding region;
said welding component being said at least one connecting piece having a receptacle opening;
said welding component having a component support surface for supporting said at least one connecting piece on said exhaust gas conducting component to be welded to said at least one connecting piece;
said at least one welding indicator arrangement being provided on an external circumferential region of said at least one connecting piece;
said at least one connecting piece being arranged on said exhaust gas conducting component; and,
said at least one welding region fixing said at least one connecting piece to said exhaust gas conducting component so as to cause said welding region minimum indicator of said at least one welding indicator arrangement to be covered by said at least one welding region and so as to cause said welding region maximum indicator of said welding indicator arrangement not to be covered by said at least one welding region;
wherein said welding region minimum indicator includes a contour modification of said welding component and said welding region maximum indicator includes a contour modification of the welding component;
wherein said welding component defines an external contour, said at least one welding indicator arrangement including at least one depression region with respect to said external contour of said welding component;

wherein said at least one depression region is a first depression region;
said at least one welding indicator arrangement includes a second depression region with respect to said external contour; and,
said first and second depression regions are disposed in spaced relationship to each other.

6. A welding component for welding to a component via at least one welding region, the welding component comprising:
at least one welding indicator arrangement being provided on said welding component; and,
said at least one welding indicator arrangement including a welding region minimum indicator to be covered by said at least one welding region and a welding region maximum indicator not to be covered by said at least one welding region;
wherein:
said welding component defines an external contour;
said external contour includes a first external contour region and a second external contour region offset with respect to said first external contour region;
said welding indicator arrangement includes a transition region disposed between said first and second external contour regions;
said welding region minimum indicator includes a transition from said first external contour region to said transition region; and,
said welding region maximum indicator includes a transition from said transition region to said second external contour region.

7. The welding component of claim 6, wherein:
said welding component defines a longitudinal axis (L);
said first external contour region is a first external circumferential contour region of said welding component with respect to said longitudinal axis (L);
said second external contour region is a second external circumferential contour region of said welding component with respect to said longitudinal axis (L);
said first external circumferential contour region has a first radial dimension with respect to said longitudinal axis (L);
said second external circumferential contour region has a second radial dimension with respect to said longitudinal axis (L) different from said first radial dimension; and,
a transition from said first radial dimension to said second radial dimension is provided by said transition region.

8. The welding component of claim 7, wherein said transition region is configured so as to be substantially frustoconical.

9. The welding component of claim 6, wherein said welding component has a support region for supporting said welding component on a further component to which said welding component is to be welded; and, said welding region minimum indicator has smaller spacing (d) from said support region than said welding region maximum indicator.

10. The welding component of claim 6, wherein:
said welding component is a connecting piece having a receptacle opening;
said welding component has a component support surface for supporting said connecting piece on a further component to be welded to said connecting piece; and,
said at least one welding indicator arrangement is provided on an external circumferential region of said connecting piece.

11. The welding component of claim 10, wherein said connecting piece is a sensor receptacle connecting piece for an exhaust system of an internal combustion engine.

12. An exhaust system for an internal combustion engine, comprising:
- at least one connecting piece, wherein said at least one connecting piece is a welding component for welding to an exhaust gas conducting component via at least one welding region;
- said welding component including at least one welding indicator arrangement provided on said welding component;
- said at least one welding indicator arrangement including a welding region minimum indicator to be covered by said at least one welding region and a welding region maximum indicator not to be covered by said at least one welding region;
- said welding component being said at least one connecting piece having a receptacle opening;
- said welding component having a component support surface for supporting said at least one connecting piece on said exhaust gas conducting component to be welded to said at least one connecting piece;
- said at least one welding indicator arrangement being provided on an external circumferential region of said at least one connecting piece;
- said at least one connecting piece being arranged on said exhaust gas conducting component; and,
- at least one welding region fixing said at least one connecting piece to said exhaust gas conducting component so as to cause said welding region minimum indicator of said at least one welding indicator arrangement to be covered by said at least one welding region and so as to cause said welding region maximum indicator of said welding indicator arrangement not to be covered by said at least one welding region;

wherein:

said welding component defines an external contour;

said external contour includes a first external contour region and a second external contour region offset with respect to said first external contour region;

said welding indicator arrangement includes a transition region disposed between said first and second external contour regions;

said welding region minimum indicator includes a transition from said first external contour region to said transition region; and, said welding region maximum indicator includes a transition from said transition region to said second external contour region.

* * * * *